April 15, 1924.
E. H. RYON
1,490,855
TUBE FRAME SUPPORT
Filed Oct. 20, 1923
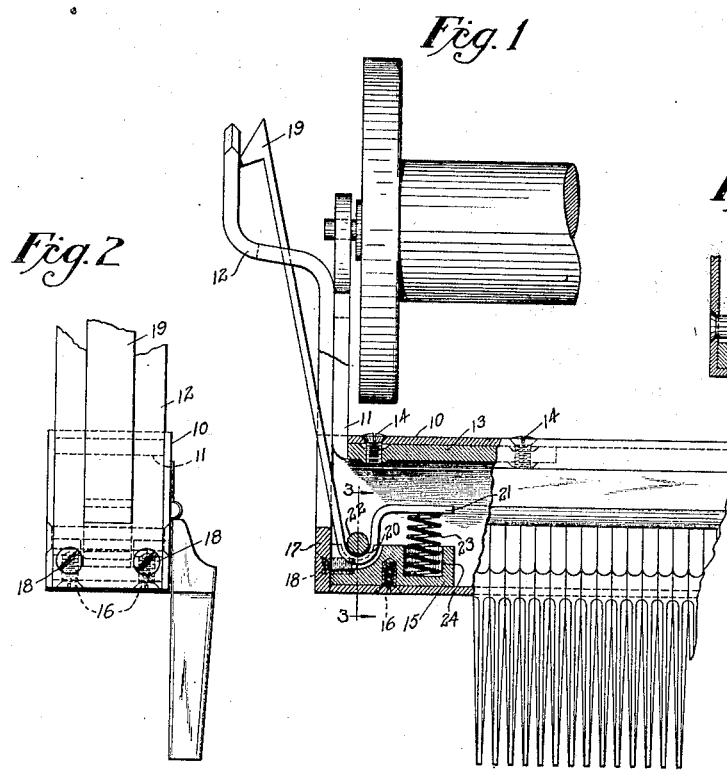
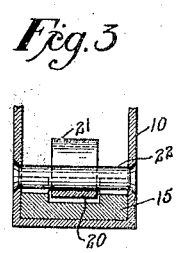
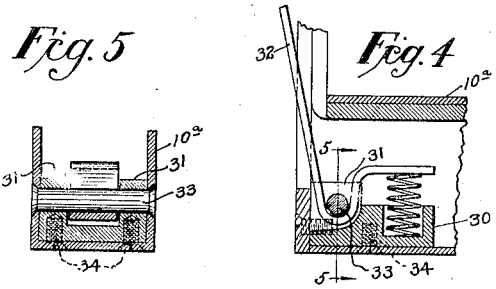
INVENTOR
EPPA H. RYON
Southgate & Southgate
ATTORNEYS Patented Apr. 15, 1924.

1,490,855

UNITED STATES PATENT OFFICE.

EPPA H. RYON, OF PASADENA, CALIFORNIA, ASSIGNOR TO CROMPTON & KNOWLES LOOM WORKS, OF WORCESTER, MASSACHUSETTS, A CORPORATION OF MASSACHUSETTS.

TUBE-FRAME SUPPORT.

Application filed October 20, 1923. Serial No. 669,869.

*To all whom it may concern:*

Be it known that I, EPPA H. RYON, a citizen of the United States, residing at Pasadena, in the county of Los Angeles and State of California, have invented a new and useful Tube-Frame Support, of which the following is a specification.

This invention relates to tube frames as used in Axminster carpet and other similar looms and particularly to an improved construction and arrangement by which a tube frame may be securely attached to a transporting pattern chain. These tube frames are now made of much greater length than was formerly the practice and this increase in length involves a corresponding increase in weight.

It is the object of my invention to provide a tube frame end bracket or support and an attaching means therefor so constructed that the bracket will safely support the increased weight; that it will be strong and reliable in use; and that it may be easily removed for repairs or replacement.

With these and other objects in view, my invention comprises certain arrangements and combinations of parts, as shown in the accompanying drawings and more specifically set forth in the appended claims.

A preferred form of the invention and a slight modification thereof are shown in the drawings in which—

Fig. 1 is a partial front elevation of a tube frame, partly in section and embodying my improved construction;

Fig. 2 is an end elevation of certain of the parts shown in Fig. 1;

Fig. 3 is a detail sectional elevation, taken along the line 3—3 in Fig. 1;

Fig. 4 is a partial sectional side elevation of a modification; and

Fig. 5 is a detail sectional elevation, taken along the line 5—5 in Fig. 4.

Referring to the drawings, I have shown a tube frame comprising the usual rectangular tubular member 10 and an end bracket or support formed with a spool supporting part 11 and a chain engaging part 12. The parts 11 and 12 are welded or otherwise firmly secured together and the part 11 is bent to form a laterally projecting arm 13 which extends within the tubular member 10 and is secured thereto by screws 14.

A block 15 is fixed in the open end of the member 10 and may be secured in position therein in any convenient manner, as by screws 16. The lower end 17 of the bracket member or part 12 extends transversely across the end of the tubular member 10 and is secured to the block 15 by screws 18.

A hook 19 extends through slots in the bracket and is provided with a curved bearing portion 20 and an inner projection 21. A stud 22 is fixed in the side walls of the member 10 and provides a bearing for the portion 20 of the hook 19. A spring 23 is seated in a recess 24 of the block 15 and engages the inner projection 21 of the hook 19, moving the hook yieldingly to the operative position shown in Fig. 1.

With this construction, it will be seen that the end bracket or support is firmly secured in position by the screws 14 and 18 and that by taking out these screws, the bracket may be readily removed for repairs or replacement. Furthermore, the spring 23 being seated in the recess 24 is safely secured against accidental displacement. All parts of the device are simply and easily constructed and the parts are also easily and accurately assembled.

In Figs. 4 and 5, I have shown a slight modification in which the block 30 is provided with upwardly extending ears 31 on each side of the hook 32 and in which the bearing stud 33 extends through the side walls of the tubular member $10^a$ and also through the ears 31, thus assisting the screws 34 in holding the block 30 from displacement. With this construction, the block becomes in effect a permanent part of the tubular member $10^a$ and can only be displaced therefrom by driving out the riveted stud 33.

Having thus described my invention and the advantages thereof, I do not wish to be limited to the exact details herein disclosed, otherwise than as set forth in the claims, but what I claim is:—

1. In a loom, a yarn tube frame comprising a tubular member, a block secured in said member, an end bracket having a portion extending across the end of said member and block and having a laterally projecting portion extending within said member, and means to secure said first portion to said block and said second portion to the upper wall of said tubular member.

2. In a loom, a yarn tube frame comprising a tubular member, a block secured in said member, an end bracket having portions secured to one wall of said member and to said block, a hook extending through said bracket and pivoted within said tubular member, and a spring seated in a recess in said block and engaging a portion of said hook to move said hook yieldingly to operative position.

3. In a loom, a yarn tube frame comprising a tubular member, a block secured in the end of said member, an end bracket having portions secured to said tubular member and to said block, a hook extending through said bracket, a pivot stud for said hook extended through said block and member and securing said block in position, and a spring to move said hook yieldingly to operative position.

In testimony whereof I have hereunto affixed my signature.

EPPA H. RYON.